US010884232B1

(12) United States Patent
Trivedi et al.

(10) Patent No.: US 10,884,232 B1
(45) Date of Patent: Jan. 5, 2021

(54) INSERTION APPARATUS INCLUDING RIGIDIZABLE BODY

(71) Applicant: General Electric Company, Schenectady, NY (US)

(72) Inventors: Deepak Trivedi, Halfmoon, NY (US); Charles Burton Theurer, Alplaus, NY (US); Anil Raj Duggal, Niskayuna, NY (US); Hongyi Zhou, Niskayuna, NY (US); Radislav Alexandrovich Potyrailo, Niskayuna, NY (US); Yizhen Lin, Cohoes, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/730,002

(22) Filed: Dec. 30, 2019

(51) Int. Cl.
G02B 23/24 (2006.01)

(52) U.S. Cl.
CPC .............................. *G02B 23/2476* (2013.01)

(58) Field of Classification Search
CPC ............ G02B 23/2476; G02B 23/2484; G02B 23/2492; G02B 23/26; G02B 23/24; G02B 23/2407–2469; H01H 2001/0021; H04N 2005/2255; A61B 1/00064; A61B 1/00066; A61B 1/00071; A61B 1/00078; A61B 1/00105; A61B 1/00108; A61B 1/0011; A61B 1/005; A61B 1/0051–0053; A61B 1/0055–0058; A61B 1/008; B25J 18/06; Y10T 74/20323
USPC ........ 356/237.1–237.6, 138–155; 250/358.1, 250/359.1, 360.1; 359/362; 33/302, 304; 73/152.01–152.62
See application file for complete search history.

(56) References Cited

U.S. PATENT DOCUMENTS 3,625,084 A 12/1971 Low
3,778,170 A 12/1973 Howell et al.
(Continued)

FOREIGN PATENT DOCUMENTS

WO WO-2019076876 A1 * 4/2019 ........... G01N 21/954

OTHER PUBLICATIONS

A compliant mechanism for inspecting extremely confined spaces, Mascarenas, et al. Smart Materials and Structures, Oct. 26, 2017, vol. 26, pp. 1-16.

*Primary Examiner* — Christina A Riddle
(74) *Attorney, Agent, or Firm* — Armstrong Teasdale LLP (57) ABSTRACT

An insertion apparatus includes an insertion end positionable within a cavity and configured to travel through the cavity, a steering end opposite the insertion end, and a body extending from the insertion end to the steering end and sized to fit within the cavity. The body includes a plurality of members flexibly coupled together and individually actuated. Each member of the plurality of members includes at least one actuator strand. At least one member of the plurality of members has a first configuration in which the at least one member of the plurality of members has a first stiffness and a second configuration in which the at least one member of the plurality of members has a second stiffness greater than the first stiffness. At least a portion of the body is flexible to facilitate travel of the body through the cavity when the at least one member of the plurality of members is in the first configuration. The at least a portion of the body is configured to maintain a selected shape when the at least one member of the plurality of members is in the second configuration.

20 Claims, 4 Drawing Sheets

(56) References Cited

U.S. PATENT DOCUMENTS

| | | |
|---|---|---|
| 4,790,624 A | 12/1988 | Van Hoye |
| 4,846,573 A | 7/1989 | Taylor |
| 4,890,602 A | 1/1990 | Hake |
| 5,337,733 A | 8/1994 | Bauerfeind |
| 5,372,162 A | 12/1994 | Frey |
| 5,482,029 A | 1/1996 | Sekiguchi |
| 6,542,230 B1 | 4/2003 | Luke |
| 6,783,491 B2 | 8/2004 | Saadat |
| 6,837,846 B2 | 1/2005 | Jaffe |
| 6,974,411 B2 | 12/2005 | Belson |
| 7,854,109 B2 | 12/2010 | Zubiate |
| 8,125,755 B2 | 2/2012 | Garcia et al. |
| 8,400,501 B2 | 3/2013 | Heyworth et al. |
| 9,016,159 B2 | 4/2015 | Kell et al. |
| 10,197,473 B2 | 2/2019 | Diwinsky et al. |
| 2004/0186350 A1 | 9/2004 | Brenneman |
| 2005/0203340 A1 | 9/2005 | Butler |
| 2012/0067158 A1* | 3/2012 | Kell ................ B25J 18/06 74/490.04 |
| 2012/0184817 A1* | 7/2012 | Sugiyama .......... A61B 1/00154 600/114 |
| 2019/0022877 A1 | 1/2019 | Akin et al. |
| 2019/0046010 A1* | 2/2019 | Tojo ................ A61B 1/00057 |

\* cited by examiner

INSERTION APPARATUS INCLUDING RIGIDIZABLE BODY

BACKGROUND

The field of the disclosure relates generally to an insertion apparatus and, more particularly, to an insertion apparatus including a rigidizable body.

At least some machines, such as rotary machines, are inspected periodically to determine if components of the machines need repair and/or replacement. However, some components of the machine may be difficult to access and inspect without disassembly of the machine. For example, some components are positioned within a cavity of the machine and are difficult to access from an exterior of the cavity. Accordingly, insertion apparatus such as borescopes are commonly used to inspect and repair components within the cavity of the machine. However, the machine can include obstructions or turns in the cavity that are difficult for at least some known insertion apparatus to navigate around. Moreover, at least some known insertion apparatus experience forces such as gravity that cause the insertion apparatus to deform or shift out of a desired position as the insertion apparatus travel and operate within the cavity. However, at least some known insertion apparatus are not capable of flexing to navigate around objects and maintaining a desired shape when experiencing forces on the insertion apparatus.

At least some known insertion apparatus are connected to actuators located on an exterior of the cavity and configured to steer the insertion apparatus around obstacles and position the insertion apparatus at desired locations within the cavity. For example, the actuators are connected to the insertion apparatus by cables or rods that transmit forces to the insertion apparatus for positioning the insertion apparatus within the cavity. However, at least some known actuators limit the range of movement of the insertion apparatus. Moreover, at least some known actuators are not able to actuate every section of the insertion apparatus because the connectors extend along multiple sections of the insertion apparatus and the actuators are not able to transmit forces to individual sections of the insertion apparatus necessary to move the sections individually. In addition, at least some known actuators increase the size of the insertion apparatus and make it difficult for the insertion apparatus to fit within the cavity.

Accordingly, it is desirable to provide an insertion apparatus including a rigidizable and actuated body that is configured to inspect or repair components positioned within a cavity of a machine.

BRIEF DESCRIPTION

In one aspect, an insertion apparatus is provided. The insertion apparatus includes an insertion end positionable within a cavity and configured to travel through the cavity, a steering end opposite the insertion end, and a body extending from the insertion end to the steering end and sized to fit within the cavity. The body includes a plurality of members flexibly coupled together and individually actuated. Each member of the plurality of members includes at least one actuator strand. At least one member of the plurality of members has a first configuration in which the at least one member of the plurality of members has a first stiffness and a second configuration in which the at least one member of the plurality of members has a second stiffness greater than the first stiffness. At least a portion of the body is flexible to facilitate travel of the body through the cavity when the at least one member of the plurality of members is in the first configuration. The at least a portion of the body is configured to maintain a selected shape when the at least one member of the plurality of members is in the second configuration.

In another aspect, a system is provided. The system includes an insertion apparatus including an insertion end positionable within a cavity and configured to travel through the cavity, a steering end opposite the insertion end, and a body extending from the insertion end to the steering end and sized to fit within the cavity. The body includes a plurality of members flexibly coupled together and individually actuated. Each member of the plurality of members has a first configuration and a second configuration. The insertion apparatus also includes a plurality of actuator strands coupled to the plurality of members and configured to individually actuate the plurality of members. The system further includes a controller configured to individually switch the plurality of members between the first configuration and the second configuration. At least a portion of the body is flexible to facilitate travel of the body through the cavity when at least one member of the plurality of members is in the first configuration. The at least a portion of the body is configured to maintain a selected shape of the body when the at least one member of the plurality of members is in the second configuration.

In yet another aspect, a method of inspecting a cavity of a machine is provided. The method includes inserting an insertion end of an insertion apparatus into the cavity. The insertion apparatus includes a body extending from the insertion end to a steering end and sized to fit within the cavity. The body includes a plurality of members flexibly coupled together and individually actuated by a plurality of actuator strands. Each member of the plurality of members has a first configuration and a second configuration. The method also includes moving the insertion apparatus through the cavity with at least one member of the plurality of members in the first configuration. At least a portion of the body is flexible and has a first stiffness that facilitates travel of the body through the cavity when the at least one member of the plurality of members is in the first configuration. The method further includes changing a shape of the body by actuating at least one member of the plurality of members using the plurality of actuator strands and switching the at least one member of the plurality of members from the first configuration to the second configuration. The at least a portion of the body is rigid and has a second stiffness greater than the first stiffness when the at least one member of the plurality of members is in the second configuration.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "rigid" refers to an object that is unable to bend or deform.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments described herein provide an insertion apparatus including a rigidizable body. The rigidizable body extends from an insertion end to a steering end and includes a plurality of members flexibly coupled together. In some embodiments, at least one maintenance device is coupled to the insertion end of the body. Each member has a first configuration in which the member has a first stiffness and a second configuration in which the member has a second stiffness greater than the first stiffness. For example, in some embodiments, each member includes a phase change material. The state of the phase change material is regulated to provide a desired stiffness for the each member. The plurality of members are individually switched between the first configuration and the second configuration to provide a desired stiffness or flexibility to selected sections of the rigidizable body. For example, at least a portion of the body is flexible to facilitate travel of the body through the cavity when at least one of the members is in the first configuration and is rigid to maintain a selected shape of the body when the at least one member is in the second configuration. Accordingly, the insertion apparatus is able to travel through locations in the cavity that require the insertion apparatus to bend or be more flexible than at least some known insertion apparatus. Also, the rigidizable body of the insertion apparatus is able to maintain a desired shape when experiencing environmental forces. Moreover, the rigid configuration of the body enables the insertion apparatus to perform maintenance operations at locations within the cavity using the maintenance device.

In addition, the insertion apparatus includes a plurality of actuator strands coupled to the members and configured to individually actuate the members. The actuator strands allow precise control of the members to provide a desired shape and position of the body. In some embodiments, each member includes a plurality of the actuator strands. Moreover, in further embodiments, the plurality of actuator strands are separated into regions of each member and are controlled individually or in groups to provide separate control of the regions of each member.

Also, in some embodiments, the body includes at least one casing and a sensor assembly configured to detect an environmental characteristic of the cavity based on a parameter of the casing. The sensor assembly is configured to provide sensor feedback for inspecting the cavity and for navigating through the cavity. For example, in some embodiments, the sensor assembly detects when the casing contacts an obstacle and operation of the insertion apparatus can be changed to account for the obstacle. In some embodiments, each member includes a discrete casing and the members are flexibly coupled together by a plurality of joints. In further embodiments, the body includes a single casing that extends along a plurality of the members. In some embodiments, the casing encloses the phase change material and the actuator strands. As a result, the insertion apparatus is compact and modular and includes a distributed actuation system that provides precise positioning of the insertion apparatus within the cavity.

Figure 1:
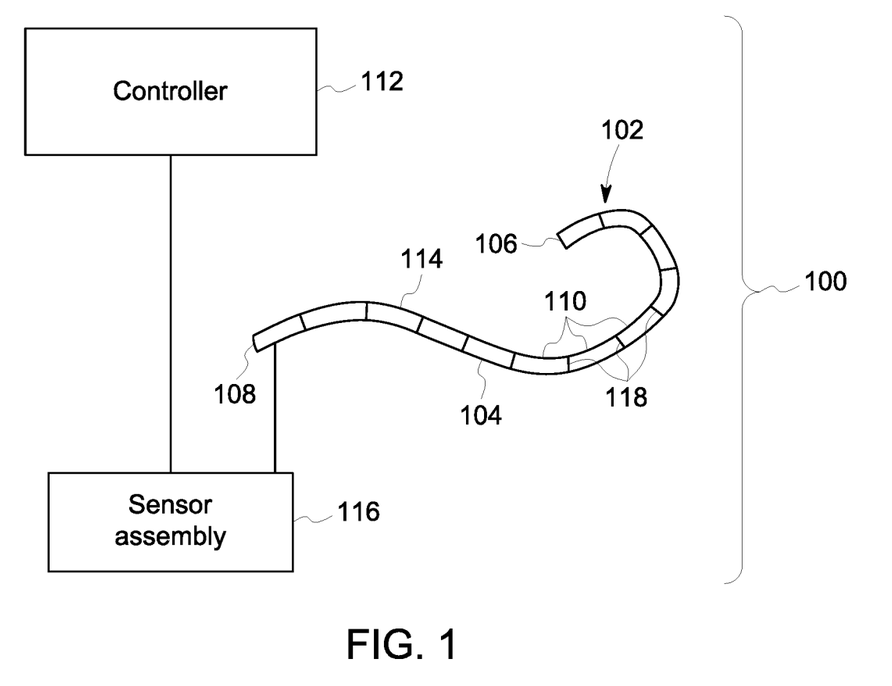
FIG. 1 is a schematic view of an insertion apparatus including a body that is rigidizable.

FIG. 1 is a schematic view of a system 100 including an insertion apparatus 102 including a body 104 that is rigidizable. Body 104 extends from an insertion end 106 to a steering end 108 and includes a plurality of members 110 flexibly coupled together. Each member 110 has a first configuration in which member 110 has a first stiffness and a second configuration in which member 110 has a second stiffness greater than the first stiffness. For example, at least a portion of body 104 is flexible to facilitate travel of body 104 through the cavity when at least one of members 110 is in the first configuration, and at least a portion of body 104 is rigid to maintain a selected shape of body 104 when at least one of members 110 is in the second configuration. In alternative embodiments, insertion apparatus 102 includes any body 104 that enables insertion apparatus 102 to operate as described herein.

In addition, in the exemplary embodiment, system 100 includes a controller 112 coupled to body 104 and configured to individually switch each member 110 between the first configuration and the second configuration. For example, in some embodiments, each member 110 includes a phase change material and controller 112 is configured to cause insertion apparatus 102 to switch the state of the phase change material between a first state and a second state. Controller 112 may be located remotely from insertion apparatus 102 and/or at least partly incorporated into insertion apparatus 102.

Moreover, in the exemplary embodiment, each member 110 includes a casing 114. Casing 114 may be plastic, metal, and/or any other suitable material. In the exemplary embodiment, each casing 114 is a hollow, closed-end cylinder constructed of a pliable material. In alternative embodiments, body 104 includes any casing 114 that enables insertion apparatus 102 to operate as described herein. For example, in some embodiments, body 104 includes a single casing 114 that extends along a plurality of members 110.

In some embodiments, a sensor assembly 116 is coupled to and/or incorporated into casing 114. Sensor assembly 116 is configured to detect environmental characteristics based on at least one parameter of casing 114. For example, in some embodiments, a plurality of sensing electrodes are coupled to or integrated into casing 114 around the perimeter of casing 114. In the exemplary embodiment, casing 114 includes a multi-layer structure including dielectric and conducting layers that form a part of sensor assembly 116. Accordingly, sensor assembly 116 is configured to detect a change in the parameters of casing 114 such as a change in resistance between sensing electrodes coupled to casing 114. The information from sensor assembly 116 is used to determine environmental characteristics of body 104 such as a position or orientation of body 104 or a force applied to body 104. In alternative embodiments, insertion apparatus 102 includes any sensor assembly 116 that enables insertion apparatus 102 to operate as described herein.

Also, in the exemplary embodiment, body 104 further includes a plurality of joints 118 coupled between casings 114. Joints 118 couple members 110 together and allow each member 110 to move relative to adjacent members 110. For example, in some embodiments, each joint 118 includes a hinge attached to casings 114 of adjacent members 110. In addition, in some embodiments, each joint 118 includes flexible electrical connections for wires and electrical components extending through body 104. In alternative embodiments, body 104 includes any joint 118 that enables body 104 to function as described herein.

Figure 2:
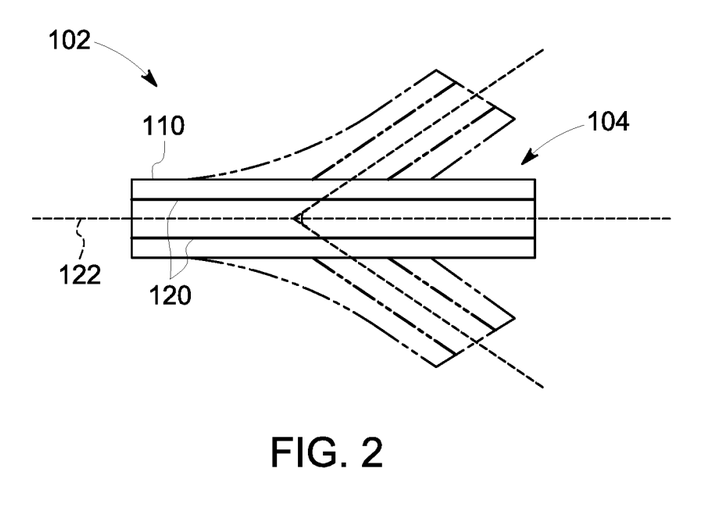
FIG. 2 is a schematic view illustrating a portion of the body of the insertion apparatus shown in FIG. 1 in a plurality of positions.

FIG. 2 is a schematic view illustrating a portion of body 104 of insertion apparatus 102 in a plurality of orientations. In the exemplary embodiment, insertion apparatus 102 includes at least one actuator strand 120 coupled to members 110 and configured to individually actuate members 110 between the plurality of orientations. For example, each member 110 is positionable between a first orientation in which member 110 extends at a first angle relative to a translation direction 122 of insertion apparatus 102, a second orientation in which member 110 is aligned with translation direction 122, and a third orientation in which member 110 extends at a second angle relative to translation direction 122. The ability to position each member 110 in a plurality of orientations facilitates moving insertion apparatus 102 through cavity and around obstacles in the cavity and precisely positioning a maintenance device 124 relative to a target location. In addition, the ability to position each member 110 in different orientations allows body 104 to assume desired shapes. In alternative embodiments, members 110 are positionable in any manner that enables insertion apparatus 102 to operate as described herein.

Figure 3:
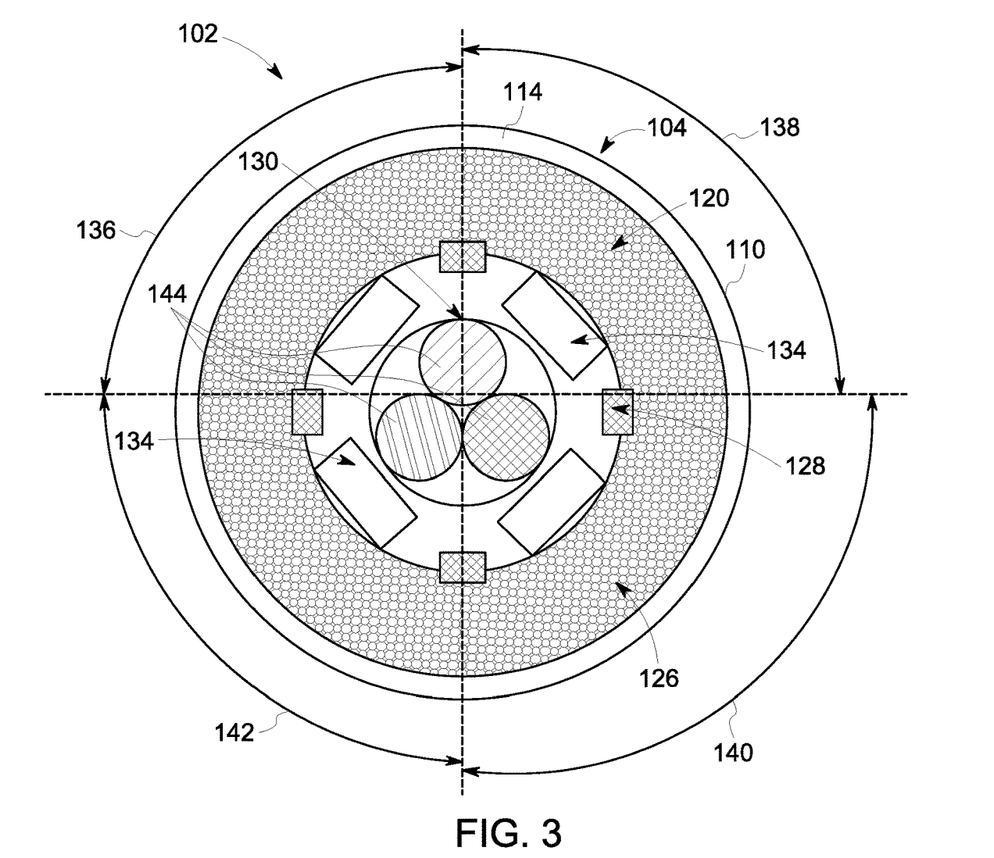
FIG. 3 is a cross-sectional view of the body of the insertion apparatus shown in FIG. 1.

FIG. 3 is a cross-sectional view of body 104 of insertion apparatus 102. In the exemplary embodiment, each member 110 of body 104 includes casing 114, a plurality of actuator strands 120, phase change material 126, and at least one phase regulator 128. Actuator strands 120 extend longitudinally through members 110 and are positioned within an annular space defined between casing 114 and a conduit 130 of body 104. Each actuator strand 120 is configured to selectively actuate at least a portion of member 110. For example, in some embodiments, a shape or cross-sectional area of actuator strand 120 changes in response to a signal from an actuator controller 134 and the change in shape or cross-sectional area of one or more actuator strands 120 causes member 110 to change shape. In particular, actuation of each actuator strand 120 is coordinated with actuation or non-actuation of other actuator strands 120 to cause body 104 to have a desired shape. In the exemplary embodiment, each actuator strand 120 has a length that is substantially equal to the length of member 110 such that actuator strands 120 extend along the entire length of members 110. In alternative embodiments, insertion apparatus 102 includes any actuator strands 120 that enable insertion apparatus 102 to operate as described herein.

In addition, in the exemplary embodiment, insertion apparatus 102 includes at least one actuator controller 134 configured to send instructions to actuator strands 120 to cause actuator strands 120 to actuate body 104. For example, the instructions may be electrical signals which activate/deactivate actuator strands 120. Insertion apparatus 102 may include a single actuator controller 134 or a plurality of actuator controllers 134. In the exemplary embodiment, a plurality of actuator controllers 134 are coupled to individual actuator strands 120 of members 110 and are configured to provide signals to individual actuator strands 120 to cause actuation of members 110. In some embodiments, actuator controllers 134 are located at joints 118 between members 110 and are coupled to ends of actuator strands 120. In further embodiments, actuator controllers 134 are located at locations along the length of members 110 and are coupled to actuate actuator strands 120 at the locations along the length of members 110. In alternative embodiments, system 100 includes any actuator controller 134 that enables system 100 to operate as described herein.

Also, in the exemplary embodiment, phase change material 126 surrounds actuator strands 120 and is selectively rigidizable to maintain actuator strands 120 and member 110 in desired positions. Phase change material 126 allows movement or flexing of actuator strands 120 when member 110 is in the first configuration and inhibits at least some movement or flexing of actuator strands 120 when member is in the second configuration. Casing 114 encloses phase change material 126 and actuator strands 120 and is pliable to allow flexing of members 110 in the first configuration. Phase change material 126 is a material that has a first state, e.g., liquid or a semi-solid, under a first set of environmental conditions and a second state, e.g., solid, under a second set of environmental conditions. In some embodiments, phase change material 126 is a metal or a wax. In alternative embodiments, insertion apparatus 102 includes any phase change material 126 that enables insertion apparatus 102 to operate as described herein.

Moreover, in the exemplary embodiment, the state of phase change material 126 is controlled using phase regulators 128. For example, each phase regulator 128 includes a thermoelectric element configured to regulate the state of phase change material 126 by controlling the temperature of phase change material 126. Accordingly, to switch member 110 from the second configuration to the first configuration, phase regulator 128 delivers heat to phase change material 126 to heat phase change material 126 above a melting point. In some embodiments, phase change material 126 and phase regulator 128 are configured to provide a binary switching of member 110 between the first configuration and the second configuration. In further embodiments, the state of phase change material 126 is regulated to provide a graduated change between phases such that each member 110 has a plurality of intermediate configurations between the first configuration and the second configuration which provide different stiffness and levels of flexibility for body 104. In alternative embodiments, insertion apparatus 102 includes any phase regulator 128 that enables insertion apparatus 102 to operate as described herein.

In addition, in the exemplary embodiment, a cross-sectional area of each member 110 is divided into a plurality of regions 136, 138, 140, 142 that are individually rigidizable. In the exemplary embodiment, each member 110 includes first region 136, second region 138, third region 140, and fourth region 142. Each region 136, 138, 140 encompasses phase change material 126 and at least one actuator strand 120. In addition, at least one actuator controller 134 and at least one phase regulator 128 are associated with each region 136, 138, 140, 142 and configured to control the shape and rigidity of region 136, 138, 140. For example, each phase regulator 128 is configured to regulate the state of phase change material 126 in a respective region 136, 138, 140, 142 and each actuator controller 134 is configured to operate actuator strands 120 to actuate a respective region 136, 138, 140, 142 of member 110. In alternative embodiments, body 104 includes any regions that enable insertion apparatus 102 to operate as described herein.

Moreover, in the exemplary embodiment, body 104 further includes at least one conduit 130 extending from insertion end 106 to steering end 108 and configured to channel fluid to members 110 to facilitate regulating the temperature of phase change material 126. In some embodiments, insertion apparatus 102 utilizes passive cooling in which heat from phase change material 126 is dissipated to fluid in conduit 130. In further embodiments, insertion apparatus 102 includes an active thermal management system such as a cooling/heating system that heats/cools a fluid and pumps the fluid through conduit 130 and/or other portions of members 110 to regulate the temperature of phase change material 126 and other components of member 110. In the exemplary embodiment, conduit 130 facilitates insertion apparatus 102 maintaining a uniform temperature of body 104 and enables insertion apparatus 102 to more reliably control the state of phase change material 126.

Figure 4:
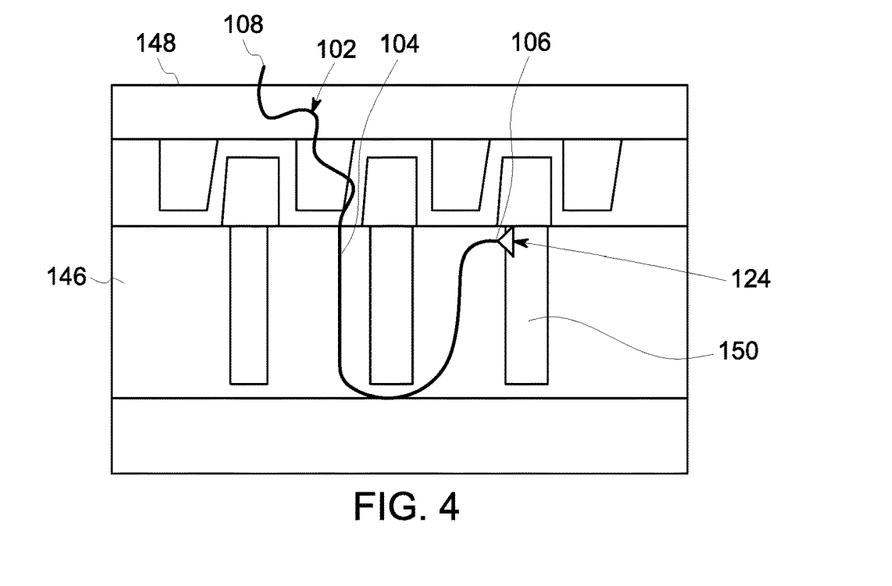
FIG. 4 is a schematic view of the insertion apparatus shown in FIG. 1 within a cavity of a machine.

Referring to FIGS. 3 and 4, in the exemplary embodiment, one or more wires 144 are positioned within conduit 130 and extend through body 104 from steering end 108 to insertion end 106. Wires 144 convey signals and/or electrical power to members 110 and/or maintenance device 124 during operation of insertion apparatus 102. In alternative embodiments, insertion apparatus 102 includes any wire 144 that enables insertion apparatus 102 to operate as described herein. In further embodiments, insertion apparatus 102 transmits and receives signals and/or power using any wired and/or wireless connections. For example, in some embodiments, a component, such as a harness or tether, extends from maintenance device 124 to the exterior of machine 148 and provides power to maintenance device 124, allows maintenance device 124 to send and/or receive signals, and/or transmits mechanical force, fluids, or thermal energy to maintenance device 124.

FIG. 4 is a schematic view of insertion apparatus 102 within a cavity 146 of a machine 148. During operation, insertion apparatus 102 enters cavity 146 of machine 148 through any suitable access port or opening of machine 148. For example, in some embodiments, insertion apparatus 102 enters and/or exits cavity 146 through any of an inlet, an exhaust, and/or an access port, such as an igniter, borescope, or fuel nozzle port. In the exemplary embodiment, body 104 of insertion apparatus 102 is sized and shaped to fit within and travel through cavity 146. For example, body 104 has a height and width that are less than a clearance required to fit within cavity 146. In addition, insertion apparatus 102 is configured to travel around obstacles in cavity 146 of machine 148. In alternative embodiments, insertion apparatus 102 is any size and shape that enables insertion apparatus 102 to operate as described herein.

Also, in the exemplary embodiment, during operation, insertion apparatus 102 is used to inspect and/or repair any interior components of machine 148. For example, in some embodiments, insertion apparatus 102 is positioned adjacent a portion of an interior surface 150 of machine 148 within cavity 146. In some embodiments, insertion apparatus 102 detects a characteristic of interior surface 150. For example, in some embodiments, insertion apparatus 102 is used to generate an image of interior surface 150 and the image is examined to determine the condition of machine 148 and assess whether repairs are necessary. In further embodiments, insertion apparatus 102 includes a sensor that detects characteristics of interior surface 150. If repairs are necessary, in some embodiments, insertion apparatus 102 is used to repair interior surface 150. After inspection and/or repair of interior surface 150, insertion apparatus 102 exits machine 148 through any suitable access port or opening of machine 148, such as via the route of entry.

Also, in the exemplary embodiment, insertion apparatus 102 includes at least one maintenance device 124 coupled to insertion end 106 of insertion apparatus 102 to allow insertion apparatus 102 to perform an inspection and/or repair operation within cavity 146 of machine 148. Insertion apparatus 102 is configured to position maintenance device 124 at a target location adjacent interior surface 150. In some embodiments, maintenance device 124 includes at least one sensor that is configured to contact surfaces. In alternative embodiments, insertion apparatus 102 includes any maintenance device 124 that enables insertion apparatus 102 to operate as described herein. For example, in some embodiments, maintenance device 124 of insertion apparatus 102 includes, without limitation, any of the following: an applicator, a drill, a grinder, a heater, a welding electrode, a sprayer, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray).

Figure 5:
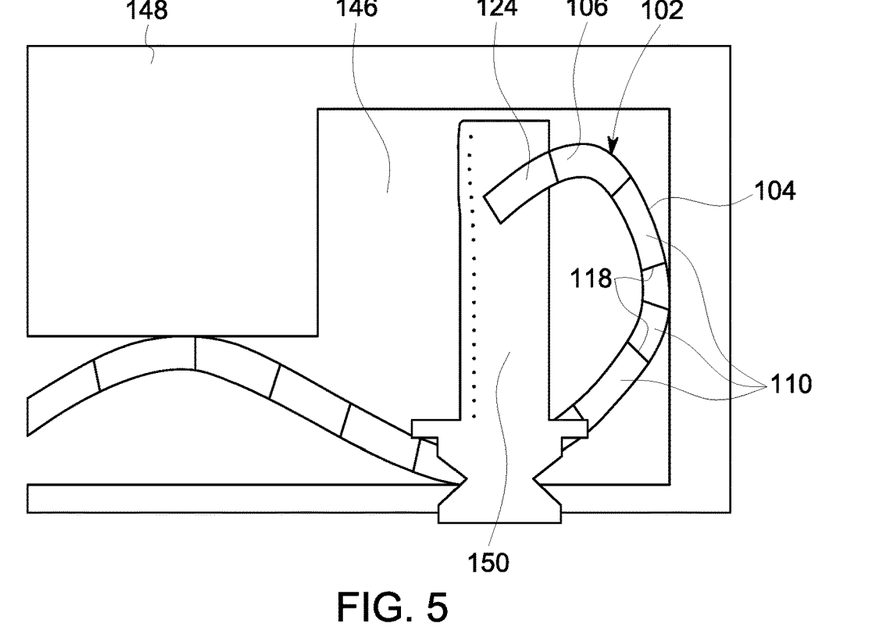
FIG. 5 is a schematic view of the insertion apparatus shown in FIG. 1 traveling within the cavity of the machine shown in FIG. 4 with at least a portion of the body in a first configuration in which the body has a first stiffness.
Figure 6:
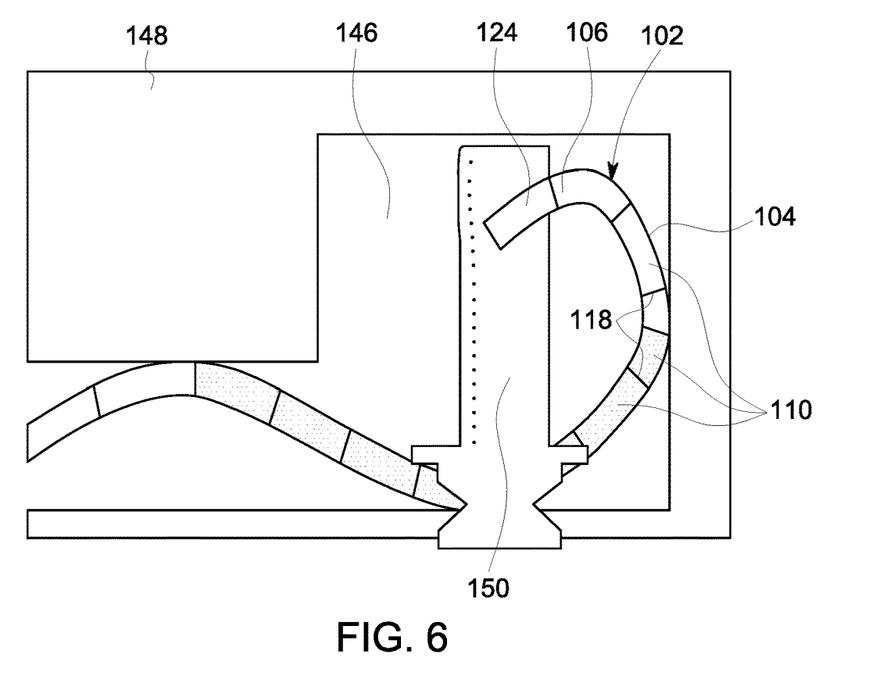
FIG. 6 is a schematic view of the insertion apparatus shown in FIG. 1 traveling within the cavity of the machine shown in FIG. 4 with at least a portion of the body in a second configuration in which the body has a second stiffness greater than the first stiffness.

FIG. 5 is a schematic view of insertion apparatus 102 traveling within cavity 146 of machine 148 with at least a portion of body 104 in a first configuration in which body 104 has a first stiffness. FIG. 6 is a schematic view of insertion apparatus 102 traveling within cavity 146 of machine 148 with at least a portion of body 104 in a second configuration in which body 104 has a second stiffness greater than the first stiffness. The first and second configurations of members 110 of body 104 enable movement of insertion apparatus 102 through cavity 146 without insertion apparatus 102 being caught on objects. For example, as shown in FIG. 5, body 104 is able to flex and bend around objects when at least one member 110 of body 104 is in the first configuration. As shown in FIG. 6, at least a portion of body 104 is substantially rigid to maintain a desired shape and resist forces against body 104 when at least one member 110 of body 104 is in the second configuration. In addition, the second configuration of members 110 allows body 104 to provide leverage for insertion apparatus 102 to move within cavity 146 and/or for maintenance device 124 to perform a maintenance operation within cavity 146.

In some embodiments, members 110 of insertion apparatus 102 are switched between the first configuration and the second configuration based on information relating to environmental conditions within cavity 146 and/or based on a location of insertion apparatus 102 within cavity 146. For example, in some embodiments, at least a portion of insertion apparatus 102 switches between the first configuration and the second configuration based on feedback from sensors such as sensor assembly 116 coupled to casing 114. In particular, sensor assembly 116 is configured to provide sensor feedback indicating contact with an obstacle. Accordingly, at least a portion of insertion apparatus 102 may switch from the first configuration to the second configuration such that members 110 contacting an obstacle are pliable. As a result, insertion apparatus 102 may prevent damage to insertion apparatus 102 and machine 148.

Figure 7:
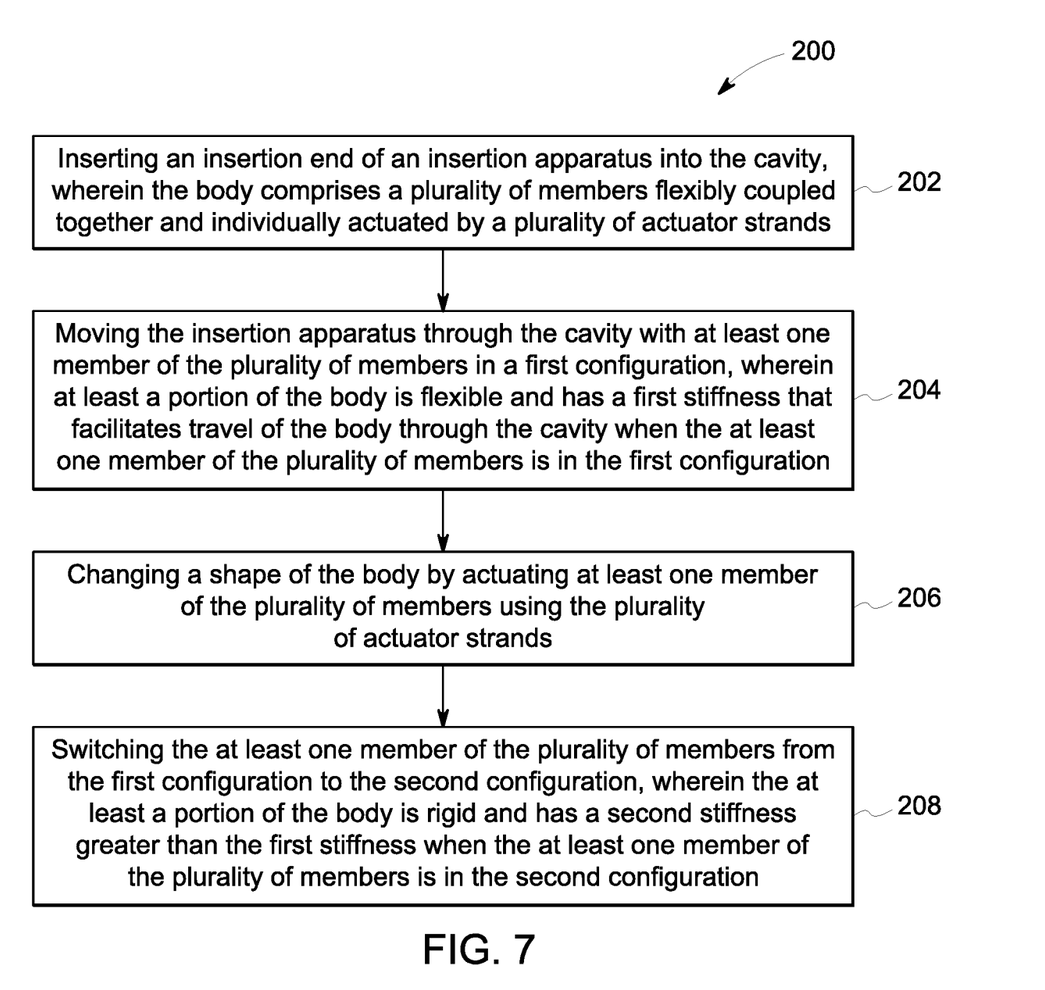
FIG. 7 is a flow chart of an exemplary method of inspecting a cavity using the insertion apparatus shown in FIG. 1.

FIG. 7 is a flow chart of an exemplary method 200 of inspecting cavity 146 (shown in FIGS. 4-6) using insertion apparatus 102 (shown in FIG. 1). In reference to FIGS. 1-7, method 200 includes inserting 202 insertion end 106 of insertion apparatus 102 into cavity 146 and moving 204 insertion apparatus 102 through cavity 146 with at least one member 110 in the first configuration. At least a portion of body 104 is flexible and has a first stiffness that facilitates travel of body 104 through cavity 146 when member 110 is in the first configuration.

Also, method 200 includes changing 206 a shape of body 104 by actuating at least one member 110 using actuator strands 120. For example, in some embodiments, actuator strands 120 in one or more regions 136, 138, 140, 142 of one or more members 110 of body 104 are operated to actuate members 110 and cause body 104 to form a desired shape such as a curved shape.

In addition, method 200 includes switching 208 at least one member 110 from the first configuration to the second configuration. For example, in some embodiments, phase change material 126 in one or more regions 136, 138, 140, 142 of one or more members 110 of body 104 is switched between a first state and a second state to switch member 110 between the first configuration and the second configuration. At least a portion of body 104 is rigid and has a second stiffness greater than the first stiffness when member 110 is in the second configuration. Accordingly, when at least one member 110 is in the second configuration, body 104 is able to resist forces acting on insertion apparatus 102 and provide leverage for insertion apparatus 102 to be positioned within cavity 146 and perform maintenance operations.

In some embodiments, method 200 includes positioning maintenance device 124 coupled to insertion end 106 of insertion apparatus 102 at a target location within cavity 146, and performing a maintenance operation using maintenance device 124. In some embodiments, the maintenance operation includes inspecting and/or repairing interior surface 150 of machine 148.

Moreover, in some embodiments, method 200 includes sensing at least one environmental condition of insertion apparatus 102 using a sensor assembly such as sensor assembly 116 coupled to casing 114. For example, in some embodiments, one or more members 110 of body 104 automatically switch between the first configuration and the second configuration when casing 114 contacts an obstacle within cavity 146.

An exemplary technical effect of the methods, systems, and apparatus described herein includes at least one of: (a) reducing the time to inspect and/or repair a machine; (b) increasing the accessibility of difficult-to-reach locations within a cavity for inspection and/or in situ repair; (c) reducing the time that machines are out of service for maintenance; (d) increasing the precision and/or reliability of inspection and repair of machines; (e) reducing unplanned service outages for machines; and (f) enhancing data capture for use in quantifying and/or modeling the service condition of at least some components of the machine.

Exemplary embodiments of methods and systems for use with machines are not limited to the specific embodiments described herein, but rather, components of systems and/or steps of the methods may be utilized independently and separately from other components and/or steps described herein. For example, the methods and systems may also be used in combination with other systems requiring inspection and/or repair of components, and are not limited to practice with only the systems and methods as described herein. Rather, the exemplary embodiment can be implemented and utilized in connection with many other applications, equipment, and systems that may benefit from using an insertion apparatus for inspection and/or repair.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An insertion apparatus comprising:
an insertion end positionable within a cavity and configured to travel through the cavity;
a steering end opposite said insertion end;
a body extending from said insertion end to said steering end and sized to fit within the cavity, wherein said body comprises a plurality of members flexibly coupled together and individually actuated, each member of said plurality of members including at least one actuator strand having a length that is substantially equal to a length of the corresponding member, wherein at least one member of said plurality of members has a first configuration in which said at least one member of said plurality of members has a first stiffness and a second configuration in which said at least one member of said plurality of members has a second stiffness greater than the first stiffness, wherein at least a portion of said body is flexible to facilitate travel of said body through the cavity when said at least one member of said plurality of members is in the first configuration, and wherein said at least a portion of said body is configured to maintain a selected shape when said at least one member of said plurality of members is in the second configuration; and
at least one actuator controller coupled to said at least one actuator strand and configured to send a signal to said at least one actuator strand to cause actuation of said corresponding member, the signal operable to change a shape or cross-sectional area of said at least one actuator strand.

2. The insertion apparatus in accordance with claim 1, wherein said at least one member of said plurality of members comprises a phase change material configured to switch between a first state corresponding to the first configuration and a second state corresponding to the second configuration.

3. The insertion apparatus in accordance with claim 2, wherein said at least one member of said plurality of members further comprises at least one phase regulator configured to regulate a state of said phase change material.

4. The insertion apparatus in accordance with claim 2, wherein said at least one member of said plurality of members further comprises a casing enclosing said phase change material and said at least one actuator strand.

5. The insertion apparatus in accordance with claim 1, wherein said body further comprises a conduit configured to channel fluid to said plurality of members for regulating the temperature of said plurality of members.

6. The insertion apparatus in accordance with claim 1, wherein said at least one actuator strand comprises a plurality of actuator strands, and wherein a cross-sectional area of said at least one member of said plurality of members is divided into a plurality of regions that are individually rigidizable, each region of said plurality of regions encompassing at least one actuator strand of said plurality of actuator strands.

7. The insertion apparatus in accordance with claim 1, wherein said body further comprises a plurality of joints coupling said plurality of members together and configured to allow said plurality of members to move relative to each other.

8. The insertion apparatus in accordance with claim 1, wherein each said member of said plurality of members comprises at least one actuator controller coupled to said at least one actuator strand and configured to operate said at least one actuator strand to actuate each said member of said plurality of members.

9. The insertion apparatus in accordance with claim 1, wherein said body comprises a single casing enclosing said plurality of members and flexibly coupling said plurality of members together.

10. The insertion apparatus in accordance with claim 1, wherein said body further comprises at least one casing and a sensor assembly coupled to said at least one casing, and wherein said sensor assembly is configured to detect a characteristic of said at least one casing.

11. A system comprising:
an insertion apparatus comprising:
an insertion end positionable within a cavity and configured to travel through the cavity;
a steering end opposite said insertion end;
a body extending from said insertion end to said steering end and sized to fit within the cavity, wherein said body comprises a plurality of members flexibly coupled together and individually actuated, wherein each member of said plurality of members has a first configuration and a second configuration;
a plurality of actuator strands coupled to said plurality of members and configured to individually actuate said plurality of members, wherein each actuator strand of said plurality of actuator strands has a length that is substantially equal to a length of a corresponding member; and at least one actuator controller coupled to each said actuator strand of said plurality of actuator strands and configured to send a signal to each said actuator strand to cause actuation of said plurality of members, the signal operable to change a shape or cross-sectional area of each said actuator strand; and
a controller configured to individually switch said plurality of members between the first configuration and the second configuration, wherein at least a portion of said body is flexible to facilitate travel of said body through the cavity when at least one member of said plurality of members is in the first configuration, and wherein said at least a portion of said body is configured to maintain a selected shape of said body when said at least one member of said plurality of members is in the second configuration.

12. The system in accordance with claim 11, wherein each said member of said plurality of members comprises a phase change material configured to switch between a first state corresponding to the first configuration and a second state corresponding to the second configuration.

13. The system in accordance with claim 12, wherein each said member of said plurality of members further comprises a casing enclosing said phase change material and at least one actuator strand of said plurality of actuator strands.

14. The system in accordance with claim 12, wherein each said member of said plurality of members further comprises at least one phase regulator configured to regulate a temperature of said phase change material.

15. The system in accordance with claim 11, wherein a cross-sectional area of each said member of said plurality of members is divided into a plurality of regions that are individually rigidizable, each region of said plurality of regions encompassing at least one actuator strand of said plurality of actuator strands.

16. The system in accordance with claim 11, wherein said body further comprises a plurality of joints coupling said plurality of members together and configured to allow said plurality of members to move relative to each other.

17. A method of inspecting a cavity of a machine, said method comprising:
inserting an insertion end of an insertion apparatus into the cavity, the insertion apparatus including a body extending from the insertion end to a steering end and sized to fit within the cavity, wherein the body includes a plurality of members flexibly coupled together and individually actuated by a plurality of actuator strands, wherein each actuator strand has a length that is substantially equal to a length of a corresponding member, and wherein each member of the plurality of members has a first configuration and a second configuration;
moving the insertion apparatus through the cavity with at least one member of the plurality of members in the first configuration, wherein at least a portion of the body is flexible and has a first stiffness that facilitates travel of the body through the cavity when the at least one member of the plurality of members is in the first configuration;
sending a control signal to at least one actuator strand of the plurality of actuator strands from at least one actuator controller, the control signal operable to change a shape or cross-sectional area of the at least one actuator strand;
changing a shape of the body by actuating at least some of the plurality of members using the plurality of actuator strands; and switching the at least one member of the plurality of members from the first configuration to the second configuration, wherein the at least a portion of the body is rigid and has a second stiffness greater than the first stiffness when the at least one member of the plurality of members is in the second configuration.

18. The method in accordance with claim 17 further comprising positioning a maintenance device coupled to the insertion end of the insertion apparatus at a target location within the cavity and performing a maintenance operation using the maintenance device.

19. The method in accordance with claim 17, wherein each member of the plurality of members includes a phase change material, and wherein switching the at least one member of the plurality of members from the first configuration to the second configuration comprises switching the phase change material between a first state and a second state.

20. The method in accordance with claim 17, wherein the body further includes at least one casing, the method further comprising sensing at least one environmental condition using a sensor assembly coupled to the at least one casing.

* * * * *